A. A. GERICKE.
WHEEL.
APPLICATION FILED AUG. 11, 1915.

1,180,289. Patented Apr. 25, 1916.

Witnesses:
J. L. Harbacher.
Jean Joyer

Inventor:
Alexander A. Gericke
By Chapin & Ferguson
Attorney

UNITED STATES PATENT OFFICE.

ALEXANDER A. GERICKE, OF BALTIMORE, MARYLAND.

WHEEL.

1,180,289.  Specification of Letters Patent.  Patented Apr. 25, 1916.

Application filed August 11, 1915. Serial No. 45,013.

*To all whom it may concern:*

Be it known that I, ALEXANDER A. GERICKE, a citizen of the United States, residing at Baltimore, in the State of Maryland, have invented certain new and useful Improvements in Wheels, of which the following is a specification.

This invention relates to improvements in wheels, and has for its object to provide a device especially adapted for use on automobiles and motor vehicles whereby the pneumatic tires generally in use on such vehicles may be dispensed with, at the same time retaining the cushioned effect produced by the use of said pneumatic tires.

The invention consists of the novel construction and arrangement of the parts and combination of parts hereinafter more fully set forth in the following specification and pointed out in detail in the appended claims.

Figure 1:
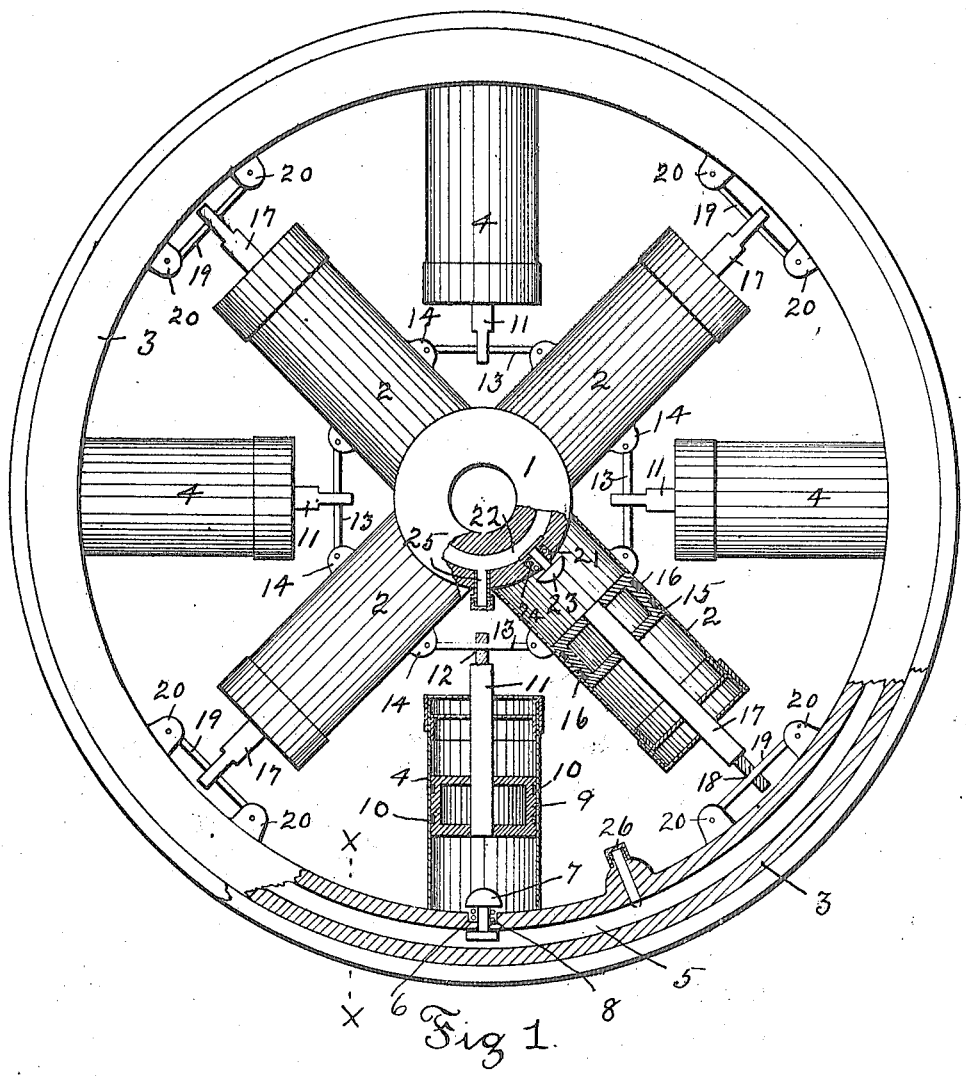
Figure 2:
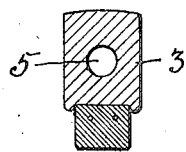
Figure 3:
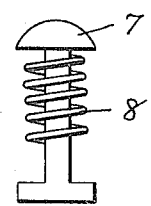

In the accompanying drawings,—Figure 1 is a side elevation of a wheel, partly in section, embodying my invention. Fig. 2 is a vertical section on the line X—X of Fig. 1. Fig. 3 is an enlarged detail view of one of the valves.

Referring to the accompanying drawing, forming part of this specification, and in which like reference numerals designate like parts throughout the several views thereof, 1 designates the hub which is provided with four integral cylinders 2, and 3 designates the rim of the wheel which is also provided with four integral cylinders 4 arranged equidistant between the cylinders 2. The said rim is provided with an annular aperture 5 and openings 6 leading from said annular aperture 5 to the cylinders 4, which said openings 6 are each provided with a valve 7 normally held unseated by the coiled spring 8. Said cylinders 4 are each provided with a piston 9 having split rings 10 in the side walls thereof, and a stem 11 projecting through the end of the cylinder 4 and having an aperture 12 near its outer end through which the rod 13 passes. Said rods 13 have their ends secured to the lugs 14 on the sides of the cylinders 2. The cylinders 2 are also each provided with a piston 15 having split rings 16 in the side walls thereof, and a stem 17 projecting through the end of the cylinder and having an aperture 18 near its outer end through which the rod 19 passes. Said rods 19 have their ends secured to the lugs 20 on the rim 3. The said cylinders 2 are each provided with a port 21 leading to the annular aperture 22 in the hub 1, said port 21 being controlled by a valve 23 held normally unseated by the coiled spring 24. The hub 1 is also provided with a nipple 25 leading to the annular aperture 22, and the rim 3 is also provided with a nipple 26 leading to the annular aperture 5, through which air is pumped to said annular apertures. The ends of the piston stems 11 and 17 being slidably mounted on the rods 13 and 19, respectively, permits of displacement as the wheels revolve.

The operation of the device is as follows: Air is pumped through the nipple 25 to the aperture 22 and equalizes in the cylinders 2, and air also pumped through the nipple 26 to the aperture 5 and equalizes in the cylinders 4. As the wheel turns the weight will force down the pistons in the cylinders as they pass below the center causing valves 7 and 23 in said cylinders to seat, thus forming a cushion between the piston 15 and the hub, and the piston 9 and the rim 3. As the cylinders pass above the center and are relieved of the weight thereon, the said valves 7 and 23 will be unseated by the action of the springs 8 and 24.

Having thus described my invention what I claim is:

1. In a wheel, the combination of a hub having an annular aperture therein, a rim having an annular aperture therein, a number of cylinders between the hub and rim each having communication with the annular aperture in said hub, and a number of cylinders between the hub and rim each having communication with the annular aperture in said rim.

2. In a wheel, the combination of a hub having an annular aperture therein, a rim having an annular aperture therein, a number of cylinders between the hub and rim each having communication with the annular aperture in the hub, a number of cylinders between the hub and rim each having communication with the annular aperture in said rim, and a piston in each of said cylinders.

3. In a wheel, the combination of a hub having an annular aperture therein, a number of cylinders connected to said hub and having communication with the annular aperture therein, a rod secured to the outer surface of each of said cylinders, a rim having an annular aperture therein, a number of cylinders connected to said rim and having communication with said annular aperture in said rim, a number of rods secured to said rim, a piston in each of the cylinders connected to the hub having a stem projecting through the cylinder and having its outer end slidably connected to one of said rods on the rim, and a piston in each of the cylinders connected to the rim and having a stem projecting through the cylinders and its outer end slidably connected to one of the rods which are secured to the cylinders.

4. In a wheel, the combination of a hub having an annular aperture therein, a number of cylinders connected to said hub and each having a port leading to said annular aperture, a valve to control said port, a rim having an annular aperture therein, a number of cylinders connected to said rim and each having a port leading to the annular aperture in the rim, a valve in each cylinder to control the port leading to the annular aperture in the rim, a piston in each cylinder the stems of which have their outer ends slidably connected to the wheel.

In testimony whereof I affix my signature in the presence of two witnesses.

ALEXANDER A. GERICKE.

Witnesses:
CHAPIN A. FERGUSON,
MAUDE M. AMOSS.

Copies of this patent may be obtained for five cents each, by addressing the "Commissioner of Patents, Washington, D. C."